(12) United States Patent  (10) Patent No.: US 7,481,920 B2
Grimmel                    (45) Date of Patent:    Jan. 27, 2009

(54) FINE-SCREENED GRID

(76) Inventor: Olaf Grimmel, Boschstrasse3, Ober-Moerlen (DE) 61239

( * ) Notice: Subject to any disclaimer, the term of this patent is extended or adjusted under 35 U.S.C. 154(b) by 34 days.

(21) Appl. No.: 10/556,490

(22) PCT Filed: May 13, 2004

(86) PCT No.: PCT/DE2004/001011

§ 371 (c)(1),
(2), (4) Date: Jan. 26, 2007

(87) PCT Pub. No.: WO2004/101105

PCT Pub. Date: Nov. 25, 2004

(65) Prior Publication Data

US 2007/0181471 A1   Aug. 9, 2007

(30) Foreign Application Priority Data

May 13, 2003  (DE) ................................. 103 21 374

(51) Int. Cl.
E03F 5/14 (2006.01)

(52) U.S. Cl. ...................... 210/159; 210/162; 210/408; 210/413

(58) Field of Classification Search .................. 210/106, 210/156, 159, 162, 408, 413
See application file for complete search history.

(56) References Cited

U.S. PATENT DOCUMENTS

| 2,086,821 | A | * | 7/1937 | Raisch | 210/159 |
| 3,209,914 | A | * | 10/1965 | Nordell et al. | 210/159 |
| 4,265,750 | A | * | 5/1981 | Meunier | 210/159 |
| 4,709,804 | A | * | 12/1987 | Duperon | 210/413 |
| 4,725,365 | A | * | 2/1988 | Albrecht, III | 210/159 |
| 5,051,174 | A | | 9/1991 | Nungaray | |
| 5,167,803 | A | * | 12/1992 | Newton et al. | 210/162 |
| 5,300,221 | A | * | 4/1994 | Austevoll | 210/159 |
| 5,425,875 | A | * | 6/1995 | Duperon | 210/162 |
| 5,534,140 | A | * | 7/1996 | Brummond et al. | 210/159 |
| 2004/0112845 | A1 | * | 6/2004 | Mattox | 210/159 |

FOREIGN PATENT DOCUMENTS

DE   73 36 288 U    1/1974
DE   23 37 074 A1   2/1975

(Continued)

OTHER PUBLICATIONS

International Search Report Dated Aug. 25, 2004 (six (6) pages).
German Search Report dated Jan. 19, 2004 with English translation (Six (6) pages).

Primary Examiner—Christopher Upton
(74) Attorney, Agent, or Firm—Crowell & Moring LLP

(57) ABSTRACT

Disclosed is a fine-screened grid having a screening grate. A slider is guided on the grid grate to remove debris therefrom. The slider is connected to a slider arm which, together with a guide lever, forms a knee lever. The configuration enables the slider to pass over large or heavy objects because it can be moved away from the screening grate as a result of the geometry and kinematics of the knee lever. The system can operate continuously without monitoring, because larger particles which cannot be carried by the slider and which collect at the beginning of the screening grate can be removed when convenient. Rinsing nozzles, which are disposed on the upper end of the screening grate, are provided in order to improve the transfer of retained particles from the slider to a capturing groove.

20 Claims, 2 Drawing Sheets

FOREIGN PATENT DOCUMENTS

| | | |
|---|---|---|
| DE | 29 44 047 A1 | 6/1981 |
| DE | 41 19 593 A1 | 12/1992 |
| FR | 2 164 100 A | 7/1973 |
| FR | 2 310 970 | 12/1976 |
| FR | 2 728 596 | 6/1996 |
| GB | 1 525 871 | 9/1978 |

* cited by examiner

FINE-SCREENED GRID

CROSS REFERENCE TO RELATED APPLICATIONS

This application is a national stage of PCT International Application No. PCT/DE2004/001011, filed May 13, 2004, which claims priority under 35 U.S.C. § 119 to German Patent Application No. 103 21 374.0 filed May 13, 2003.

BACKGROUND AND SUMMARY OF THE INVENTION

The invention relates to a fine-screened grid having a screening grate and having a motor-driven slider, which can be moved along the interior surface area of the screening grate, for clearing the screening grate. The slider may be connected with a slider arm which is disposed on a swivellable guide lever, rotatably around a pivot with its end facing away from the slider. In one position of the guide lever, the clearing position, the pivot is in a position in which the slider rests against the screening grate. In free positions, the pivot occupies a position in which the slider is away from the screening grate.

Fine-screened grids, among other uses, are used in the purification of industrial and domestic waste water. Before the waste water passes through further purification stages, coarse impurities have to be removed from it. Such a purification stage is conducted, for example, in a grit chamber in which fine-grained particles and suspended matter are removed from the waste water. However, coarse particles can also be removed from other liquids in such systems.

In the case of a fine-screened grid, the water to be purified is guided through a screening grate disposed diagonally in a water passage. The exemplary screening grate holds back fine to coarse particles corresponding to its gap width, and preferably has a curved surface. The material collecting in front of or on the screening grate is moved by means of a slider to the one end, the upper end of the screening grate, where it falls over the discharge edge of the screening grate into a container or into a conveying element. The slider moves along on a path displaced away from the screening grate to return to the start of its motion, at the lower end of the screening grate, where it resumes the purification work. Such systems are typically called fine-screened grids, operating without any limitation with respect to the size of the held-back particles.

A fine-screened grid is described in German Published Patent Application DE 41 19 593 A1. The slider is situated on a slider arm which, rotatably about a pivot with its end facing away from the slider, is disposed on a swivellable guide lever in the form of a platform. In the normal position of the guide lever, the motor-driven pivot is situated in the cylinder axis of the quarter-cylindrically constructed screening grate, so that the path of the movement of the slider during clearing of the screening grate extends directly adjacent thereto. The platform is tilted toward the rear, so that the slider can be moved on an oppositely extending path back to the start of the screening grate. The pivot is thus removed from the screening grate and the slider arrives at a certain distance marked x in the published patent application to the screening grate.

Problems occurs when using conventional fine-screened grids, such as the fine-screened grids according to the above-mentioned published patent document, because not only relatively small particles collect at the screening grate, which can be removed by the slider without any problem, but frequently also very large particles which are not typical of waste water. For example, rocks may have detached from the walls of the sewage system, or construction waste may have entered the sewage system during construction work at open sewage system intake points.

Such large particles block the slider in its clearing movement, which may eventually result in damage to the system and which will result in an interruption of the clearing operation which has to be restored immediately.

However, since such systems frequently run without monitoring, a blocking of the slider often results in a fairly long interruption before the damage can be detected and eliminated.

It is therefore an object of the invention to provide a fine-screened grid which continues to operate even when heavy and unwieldy particles are carried by the fluid being screened.

The embodiments of the invention provide a swivellable guide lever that is freely movable, so that it can be moved into the clearing position as a result of gravity on its mass, and can be moved into a free position as a result of a force applied to the slider by the material to be cleared.

In contrast to the system according to German Patent Document DE 41 19 593 A1, the guide lever of the invention is not adjustable by a motor, but can follow a movement forced onto the slider. Normally, the slider is pressed against the screening grate by the weight of the guide lever so that it is virtually moved without any gap along the screening grate. In the process, the slider takes along small particles which have not fallen through the screening grate. If larger particles are situated in front of the screening grate, the slider moves over them, in which case it moves away from the screening grate and thereby brings the guide lever into a free position. Because it is swivellable, the guide lever does not permit a return of the slider along a path at a distance with respect to the screening grate, but it enables the slider to be displaced away from the screening grate during the clearing movement in order the pass over the larger particles situated there.

In some cases, the particles are caught by the slider, so that they are taken along and cleared although the slider does not rest directly on the screening grate. However, as a rule, these large particles remain at the start of the screening grate and can be removed by other means when the opportunity arises. In this condition, the clearing performance of the fine-screened grid is limited only insignificantly. An unmonitored continuous operation is therefore possible.

The free mobility of the pivot also has the advantage that wear of the slider edge by the advancing of the pivot onto the screening grate in the clearing position is automatically compensated, so that the slider always rests closely against the screening grate, independently of the amount of wear.

The screening grate of the fine-screened grid preferably has a curved surface, particularly a quarter-cylindrical shape as illustrated in the above-mentioned published patent application. However, the bent-lever arrangement consisting of the slider arm and the guide lever, corresponding to the kinematics of such a knee shaped lever, permits the cleaning of other shapes of the curved surface of the screening grate, which may possibly be better suited to improve the clearing performance. For example, the screening grate could extend to be slightly flatter at the start end, and which becomes steeper only later, towards another end. The preferred quarter-cylinder arrangement described above is only one possible shape.

In one embodiment, a motor for the rotating drive of the slider is mounted on the pivot, and is supported by means of a torque bracket disposed on the guide lever. This configuration also increases the weight of the guide lever which presses the slider into the clearing position, which improves the clearing performance.

In another embodiment, it is practical to arrange the swivel pin of the guide lever above the screening grate with in a vertical extension of the screening grate's upper end. This configuration results in a particularly compact construction, while the guide lever is relatively long. This, in turn, has the advantage that the swiveling angle of the guide lever does not become too large even at a relatively large offset of the slider.

In one embodiment, the tilt of the guide lever with respect to a horizontal line preferably amounts to between about 30° and about 60°.

The construction of the exemplary fine-screened grid is characterized in that the screening grate may be arranged between two parallel side walls, and the guide lever is a double lever whose two lever arms are arranged outside the side walls. A curved oblong hole is formed in each side wall, with the pivot of the two lever arms extending through this oblong hole.

The arrangement has the advantage that the two lever arms are situated outside the housing formed by the two side walls and are therefore easily accessible for repair purposes. This applies particularly if, as mentioned above, the motor is fastened to one of the lever arms and thereby also remains accessible. In addition, the motor is not exposed to moisture and fogginess which forms inside the housing above the screening grate.

The clearing performance of the present device can be increased when the pivot is provided with at least two sliders and is fastened to the opposite pivot. Three sliders may also be used which may each be situated at intervals of 120° respectively. Four or more sliders may not be as practical, two sliders at a time would engage the screening grate, and would both move away from the screening grate if either one were to be displaced from the screening grate by an obstacle.

Because the fine-screened grid has one or more sliders, a continuous operation is possible, since the pivot retains its rotating direction which significantly simplifies the control of the fine-screened grid. In particular, no additional servomotor has to be provided in order to maintain a desired distance of the slider with respect to the screening grate for the return movement. In order to maintain this distance, other fine-screened grids have specialized return cranks which can be eliminated according to the present invention.

For receiving the screened material, a collecting groove with a screw conveyor or the like is connected to the upper end of the screening grate, on the other side of the discharge edge.

To improve the transfer of the screened material from the slider into the collecting groove, a rinsing system is provided which includes several rinsing nozzles aligned diagonally with respect to the area in front of the upper screening grate end. When the slider is in this upper position, the rinsing nozzles flush the screened material into the collecting groove. To prevent the flushed-in water from not running over at the exterior side of the collecting groove, the groove edge adjoining the screening grate is situated lower than the groove edge situated on the outside. This configuration ensures that excess water runs back only to the screening grate. Solid components carried along with it are thereby returned onto the screening grate.

The rinsing nozzles are preferably fastened on the housing walls and are situated above the screening grate on both sides of the vertical plane in which the slider arm is moving. The rinsing nozzles thus do not hinder the rotating movement of the slider arm and, since they are stationarily mounted, can easily be supplied with water.

To obtain a sufficiently long rinsing time, a switch is provided by means of which the position of the slider at the upper screening grate end can be determined. A control device is provided which, for a certain time period after the actuation of the switch, turns off the driving motor and turns on the rinsing system.

The invention will be explained in further detail in the following paragraphs which describe an exemplary embodiment according to the invention.

DETAILED DESCRIPTION OF THE DRAWINGS

Figure 1:
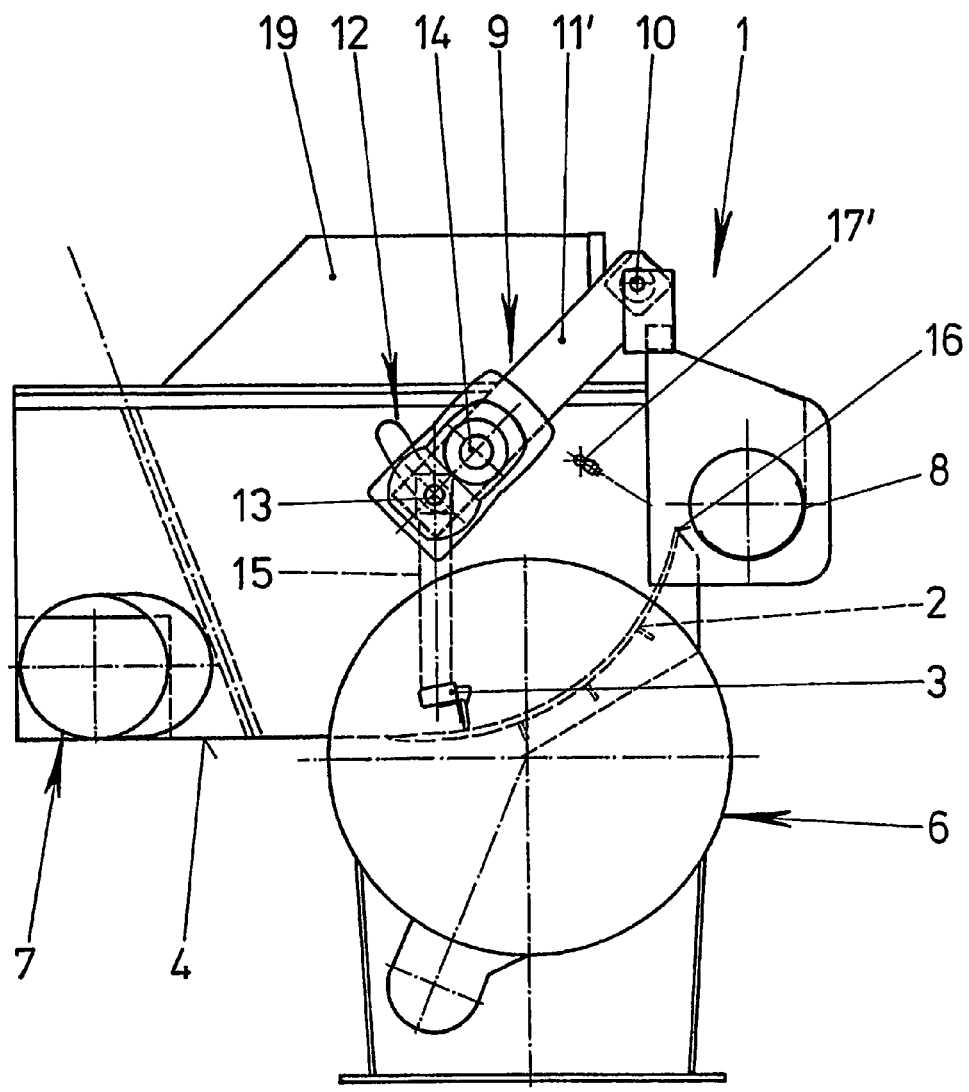
FIG. 1 is a lateral view of a fine-screened grid system according to an embodiment of the invention, illustrating the kinematics of a slider guided along a screening grate.
Figure 2:
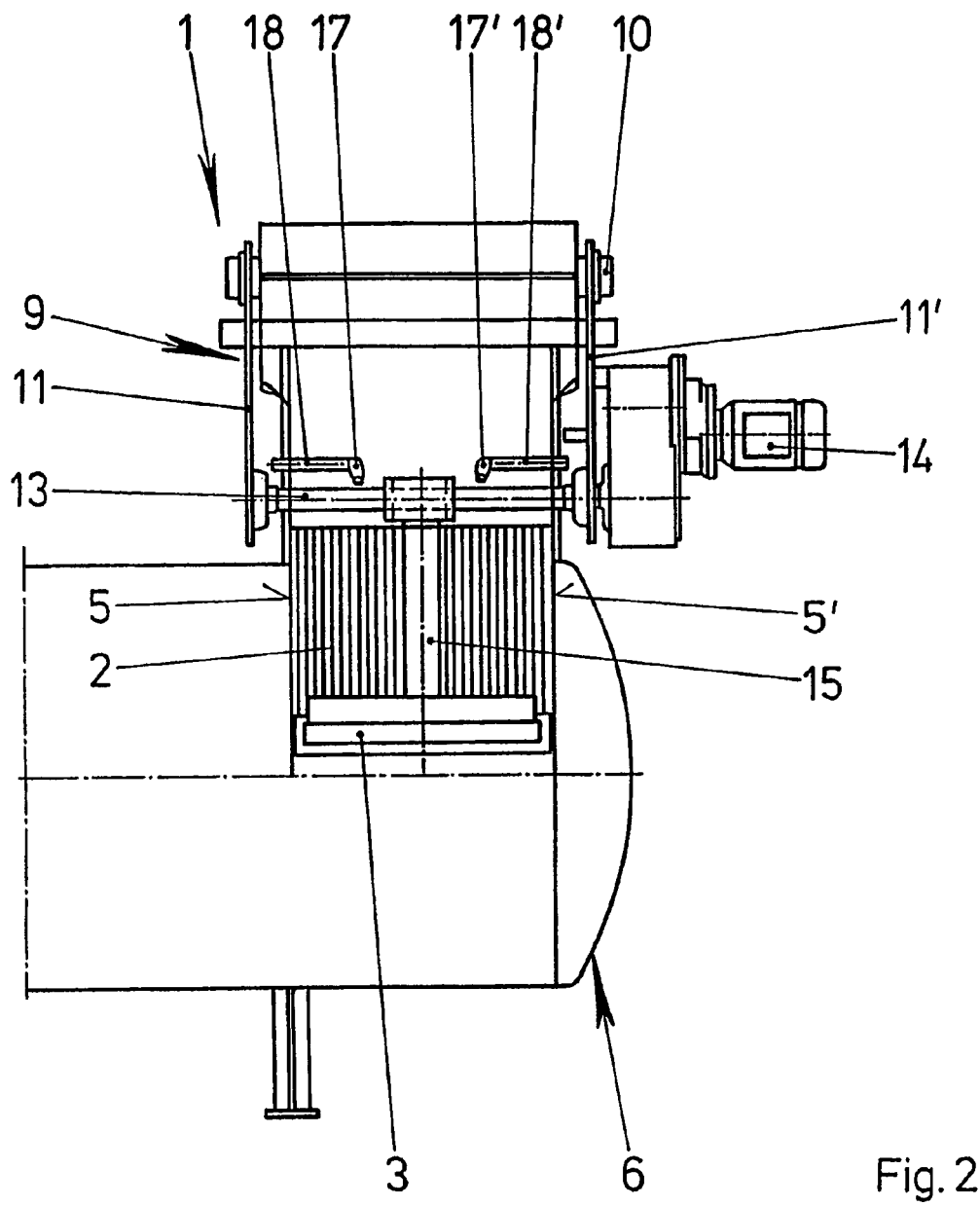
FIG. 2 is a top view of the fine-screened grid system according to FIG. 1.

A fine-screened grid system 1 consists of a screening grate 2 and a slider 3. The screening grate 2 extends on a quarter circle and therefore has the shape of a quarter of a hollow cylinder. The lower end extends tangentially into the bottom 4 of an inlet. The screening grate 2 and the bottom 4 are enclosed from both sides by side walls wall 5, 5' respectively.

In the embodiment illustrated here, the fine-screened grid 1 is inserted into a cutout of the container of a grit chamber 6, so that water running through the grate 2 arrives directly in the grit chamber 6 and selected particles larger than a desired size are trapped. A lateral inlet 7 is situated on one side wall 5. The upper end of the screening grate 2 is adjoined by a collecting groove 8 with a screw conveyor, not shown here in detail. A protective hood 19 rests on the two housing walls 5, 5'.

A swivel pin 10, on which two lever arms 11, 11' forming a guide lever 9 are non-rotatably held, is situated above the side walls 5, 5' in a vertical extension of the upper end of the screening grate 2. The lever arms 11, 11' are situated outside the side walls 5, 5', and project at an angle of approximately 45° diagonally downward, so that their ends are situated approximately above a starting portion of the screening grate 2. A pivot 13 disposed at the lever arms 11, 11' extends between the lever arms 11, 11' through curved slots 12 in the side walls 5, 5'. The pivot 13 may be driven by a motor 14 fastened to the pivot and supported by means of a torque bracket on one of the lever arms 14. The slider 3 is situated on a central sliding arm 15 non-rotatably connected with the pivot 13.

According to the illustration of FIG. 1, the motor 14 drives the pivot 13 counterclockwise, so that the slider 3 moves on a circular path extending along the screening grate 2. During the movement, smaller ones of the selected particles, which have not dropped through the screening grate 2 are pushed by the slider 3 along the surface of the screening grate 2 to an upper end portion, and are dumped over a discharge edge 16 into the receiving groove 8, where they are compressed by the screw conveyor and removed. At least one other arm with a slider, not shown in detail in the drawing, is placed on the pivot 13.

In cases where larger ones of the selected particles are found in front of the screening grate 2, particularly at its starting portion, the mechanism described above may not be able to remove them either because they are too heavy or because they are caught in the screening grate 2. In those cases the slider 3 will yield and move away from the screening grate 2, as is permitted because of the fact that the guide lever 9 can swivel upward, and the pivot 13 can move upward and rearward. As soon as the obstacle formed by the larger ones of the selected particles has passed, the weight of the knee lever formed by the guide lever 9 and the slider arm 15, will press the slider 3 back against the screening grate 2.

For improving the discharge of the screened material moved by the slider 3 to the upper end of the screening grate 2, a rinsing device may be provided, having two rinsing nozzles 17, 17' which are held on the housing by means of two water-carrying holders 18, 18' fastened to the side walls 5, 5'. A clearance space, through which the slider arm 15 is moved during its rotating movement, is situated between the rinsing nozzles 17, 17'.

A switch, not shown in detail in the drawing, is used to cause the motor 14 to be switched off as soon as the slider 3 reaches the upper end of the screening grate 2. The rinsing device is switched on, whereby the rinsing nozzles 17, 17' spray water onto the slider 3 from the rear, so that the screened material situated there is rinsed into the collecting groove 8. Excess water flows back to the screening grate 2 by way of the interior groove edge. So that no water will slosh to the outside, the exterior groove edge of the collecting groove 8 is higher than its interior edge.

The following list of Reference Numbers may be used to facilitate interpretation of the drawings and of the preceding discussion.

1 Fine-screened grid
2 Screening grate
3 Slider
4 Bottom
5,5' Side wall
6 Grit chamber
7 Inlet
8 Collecting groove
9 Guide lever
10 Swivel pin
11, 11' Lever arm
12 Slots
13 Pivot
14 Motor
15 Slider arm
16 Discharge edge
17, 17' Rinsing nozzle
18, 18' Holder
19 Protective hood

The invention claimed is:

1. A fine-screened grid, comprising a screening grate and a motor-driven slider, movable along an interior surface of the screening grate for clearing the screening grate by a motor acting directly on a slider arm, the slider being connected with the slider arm, the motor and slider arm being disposed on a swivelable guide lever rotatably about a pivot with an end facing away from the slider, wherein the guide lever has a clearing position in which the pivot is positioned such that the slider rests against the screening grate, and a free position in which the pivot is positioned such that the slider is away from the screening grate, and wherein the swivelable guide lever is freely movable into the clearing position due to its weight and into the free positions by a force applied to the slider by material being cleared.

2. The fine-screened grid according to claim 1, wherein the screening grate is disposed between two parallel side walls, and wherein the guide lever is a double lever comprising two lever arms arranged outside the side walls, each of the side walls defining a curved oblong hole through which the pivot is guided.

3. The fine-screened grid according claim 1, wherein at least two slider arms each having a slider are disposed at uniform angular intervals on the pivot, the pivot being driven in a constant rotating direction.

4. The fine-screened grid according to claim 1, further comprising a collecting groove having a screw conveyor adjoining an upper portion of the screening grate.

5. The fine-screened grid according to claim 4, wherein a first groove edge of the collecting groove adjoining the screening grate is situated lower than a second opposite groove edge thereof.

6. The fine-screened grid according to claim 4, further comprising a rinsing system comprising rinsing nozzles, the rinsing nozzles being aligned diagonally with respect to an area in front of the upper portion of the screening grate.

7. The fine-screened grid according to claim 6, wherein the rinsing nozzles are situated above the screening grate on both sides of a plane of motion of the slider arm.

8. The fine-screened grid according to claim 6, further comprising a switch for determining a position of the slider at the upper portion of the screening grate, and a control device for switching off the motor and switching on the rinsing system a selected time period after activation of the switch.

9. A fine-screened grid, comprising a screening grate and a motor-driven slider, movable along an interior surface of the screening grate for clearing the screening grate, the slider being connected with a slider arm, disposed on a swivelable guide lever rotatably about a pivot with an end facing away from the slider, wherein the guide lever has a clearing position in which the pivot is positioned such that the slider rests against the screening grate, and a free position in which the pivot is positioned such that the slider is away from the screening grate, and wherein the swivelable guide lever is freely movable into the clearing position due to its weight and into the free positions by a force applied to the slider by material being cleared;

wherein the screening grate is shaped to define a quarter of a cylinder, such that, in the clearing position, the pivot corresponds to a cylinder axis of the screening grate and, in the free position, the pivot is farther removed from the surface area of the screening grate than a radius of the cylinder.

10. The fine-screened grid according to claim 9, wherein a motor for driving the slider is mounted on the pivot and is supported on the guide lever by means of a torque bracket.

11. The fine-screened grid according to claim 9, wherein a swivel pin of the guide lever is disposed above the screening grate in a vertical extension of an upper portion of the screening grate.

12. The fine-screened grid according to claim 11, wherein the guide lever is inclined relative to its clearing position by between about 30° and about 60°.

13. A clearing mechanism for a fine-screening grid, comprising:

a screening grate dimensioned to prevent passage therethrough of selected particles;

a slider movable along a surface of the screening grate to remove smaller ones of the selected particles, the slider having a clearing position against the surface of the screening grate and a free position displaced therefrom;

a slider arm operatively connected to the slider at one end;

a guide lever connected to another end of the slider arm with a pivot and to a swivel pin; and a motor disposed on the guide lever acting directly on the slider arm to move the slider along the surface of the screening grate, wherein a weight of the slider, the slider arm and the guide lever urges the slider in the clearing position, and passage over larger ones of the selected particles urges the slider in the free position.

14. The clearing mechanism according to claim 13, wherein the surface of the screening grate is curved.

15. The clearing mechanism according to claim 13, wherein the pivot is freely movable by the slider arm and the guide lever.

16. The clearing mechanism according to claim 13, wherein the swivel pin is disposed above the screening grate.

17. The clearing mechanism according to claim 13, further comprising an additional slider operatively connected to an additional slider arm, pivotally connected to the guide lever.

18. The clearing mechanism according to claim 13, further comprising a collecting groove for receiving the smaller ones of the selected particles removed by the slider.

19. The clearing mechanism according to claim 13, further comprising a rinsing system to urge the smaller ones of the selected particles removed by the slider into a collecting groove.

20. The clearing mechanism according to claim 13, wherein the slider arm and the guide lever each comprise two substantially parallel elements with the screening grate disposed therebetween.

* * * * *